(12) United States Patent  (10) Patent No.: US 8,657,452 B2
Perrin et al.  (45) Date of Patent: Feb. 25, 2014

(54) LASER SIGHT CLEANER

(75) Inventors: Timothy B. Perrin, Roscoe, IL (US);
Thomas W. Perrin, Roscoe, IL (US);
Michael K. Woodruff, Byron, IL (US)

(73) Assignee: Chrysler Group LLC, Auburn Hills, MI (US)

( * ) Notice: Subject to any disclaimer, the term of this patent is extended or adjusted under 35 U.S.C. 154(b) by 69 days.

(21) Appl. No.: 13/327,812

(22) Filed: Dec. 16, 2011

(65) Prior Publication Data
US 2013/0155508 A1    Jun. 20, 2013

(51) Int. Cl.
*B60R 1/06*    (2006.01)
(52) U.S. Cl.
CPC .................... *B60R 1/0602* (2013.01)
USPC ......................................... 359/507
(58) Field of Classification Search
USPC ................ 15/250.001, 250.003, 250.15, 1; 359/507
See application file for complete search history.

(56) References Cited

U.S. PATENT DOCUMENTS

| | | | | |
|---|---|---|---|---|
| 4,672,708 A | * | 6/1987 | Williams | 15/250.003 |
| 4,947,094 A | * | 8/1990 | Dyer et al. | 318/587 |
| 5,020,620 A | * | 6/1991 | Field | 180/169 |
| 5,023,534 A | * | 6/1991 | Ueda et al. | 318/687 |
| 5,802,660 A | * | 9/1998 | Appleby | 15/250.003 |
| 2004/0052624 A1 | | 3/2004 | Miyano et al. | |
| 2008/0072644 A1 | * | 3/2008 | Umeno et al. | 72/131 |
| 2011/0099788 A1 | * | 5/2011 | Kilibarda | 29/428 |

FOREIGN PATENT DOCUMENTS

| | | | | |
|---|---|---|---|---|
| EP | 1239277 | | 9/2002 | |
| KR | 2008049280 | * | 6/2008 | B65G 47/46 |

* cited by examiner

*Primary Examiner* — Alicia M Harrington
*Assistant Examiner* — Marin Pichler
(74) *Attorney, Agent, or Firm* — Ralph E. Smith

(57) ABSTRACT

A system where a reflector of a laser alignment system is cleaned by a cleaning device that is actuated by an automatic guided vehicle as it passes the reflector. The laser alignment system is used to detect a position of the automatic guided vehicle relative to a location in a manufacturing facility. As the automatic guided vehicle passes the laser alignment system, a projection formed on the automatic guided vehicle will contact an element of a laser cleaning system to actuate the cleaning device over the reflector to clean it.

14 Claims, 5 Drawing Sheets

LASER SIGHT CLEANER

FIELD

The present disclosure relates to a laser sight cleaner.

BACKGROUND

Flexible manufacturing systems are predominantly machine-operated systems that can be used to manufacture products. These computer-operated machines are arranged to form various cells that each perform certain tasks to assist in the manufacturing of the products. Often, one or more of the machines used in a flexible manufacturing system can be an automatic guided vehicle (AGV). An AGV is a mobile robot that follows markers or wires in the floor of the manufacturing facility, or uses vision or lasers as its guide through the facility.

AGVs increase efficiency and reduce costs by helping to automate the manufacturing facility. AGVs can be used to tow objects behind them such as raw materials or finished products. Some AGVs can use fork lifts to lift objects for storage, or to place materials on an assembly or manufacturing line. For example, AGVs having a fork lift can be used to transfer metal blanks to the proper location along a manufacturing line in a stamping facility. When an AGV has a fork lift, a laser alignment system can be used to make sure that the tines of the fork lift (which can be retractable) have cleared a certain distance relative to the manufacturing line so that no contact between the AGV and the manufacturing line is made.

The laser alignment system generally includes a ceiling-mounted laser that emits a laser beam toward a floor-mounted reflection device. If the floor-mounted reflection device becomes dirty, the reflection device will not properly reflect the laser beam, which causes the manufacturing line to fault. If the line faults, the machine where the laser alignment system is located must be locked out and the reflector cleaned. This causes a loss in manufacturing time, which decreases productivity of the manufacturing facility.

SUMMARY

The present disclosure is directed to a system where a reflector of a laser alignment system is cleaned by a cleaning device that is actuated by an automatic guided vehicle as it passes the reflector. The laser alignment system is used to detect a position of the automatic guided vehicle relative to a location in a manufacturing facility. As the automatic guided vehicle passes the laser alignment system, a projection formed on the automatic guided vehicle will contact an element of a laser cleaning system to actuate the cleaning device over the reflector to clean it.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
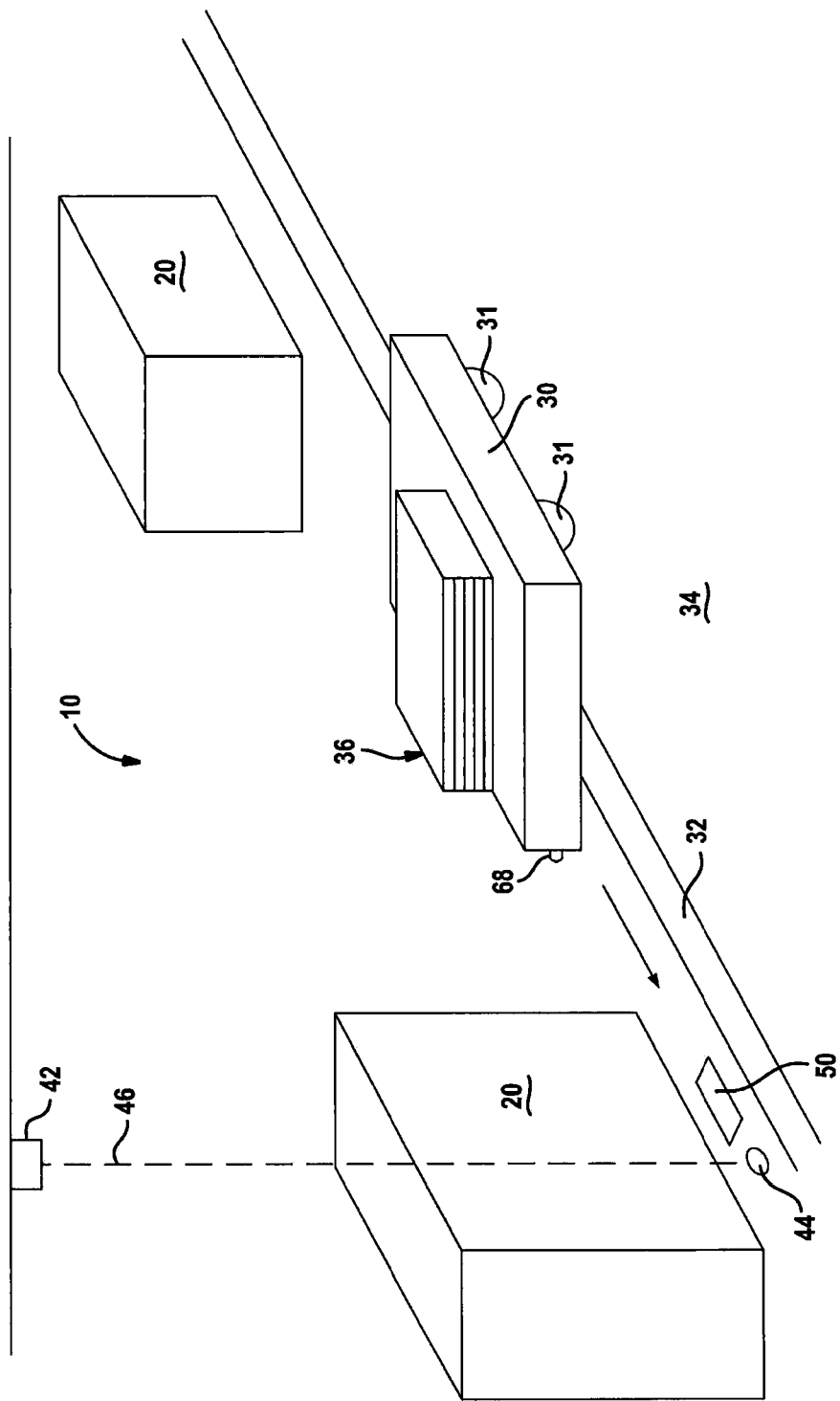
FIG. 1 is a perspective view of a manufacturing line including a laser alignment system and a cleaning system according to a principle of the present disclosure.

FIG. 1 illustrates a manufacturing line 10 located in a manufacturing facility such as, for example, a stamping facility where panels for automobiles are stamped and formed. Line 10 includes a plurality of cells 20 that are located along line 10. Each cell 20 can include different machines (not shown) that assist in manufacturing a product. For the sake of example, each cell 20 can be considered a stamping press that is used to stamp/form a panel for an automobile. It should be understood, however, that the teachings of the present disclosure are not only applicable to manufacturing lines in a stamping facility. On the contrary, the teachings of the present disclosure can be applied in a variety of industries including, but not limited to, pharmaceutical, chemical, manufacturing, automotive, paper and printing, food and beverage, medical facilities, and warehousing facilities.

Figure 2:
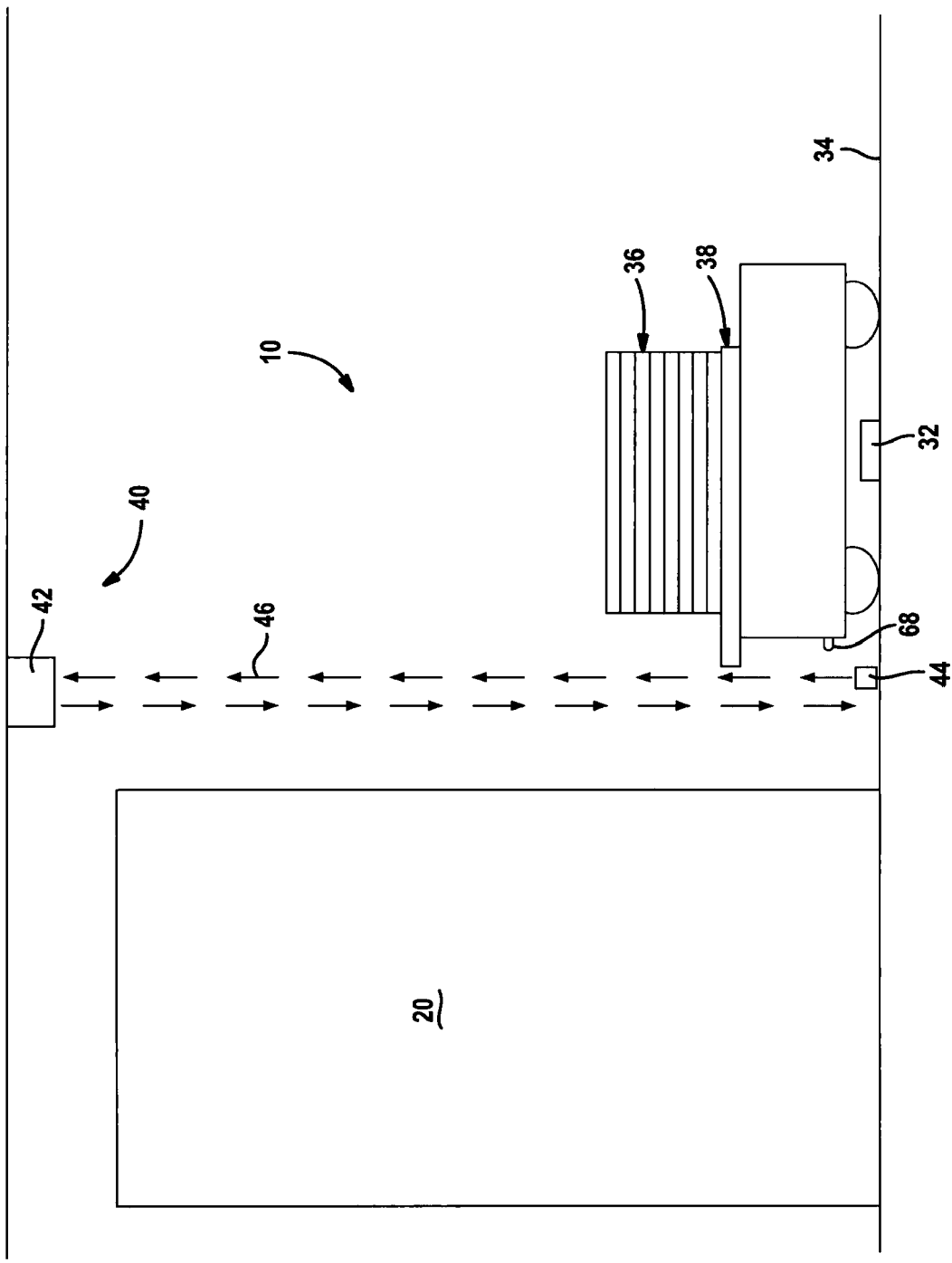
FIG. 2 is a side view of the manufacturing line illustrated in FIG. 1.

Line 10 can include an AGV 30. AGV 30 is a mobile robot that can include wheels 31 to enable AGV 30 to follow markers or wires 32 in the floor 34 along line 10. In the illustrated exemplary embodiment, AGV 30 can be used to carry a plurality of metal blanks 36 to be stamped by one of cells 20. To insert blanks 36 into cell 20, AGV 30 can include a retractable fork-lift system 38 (FIG. 2). As AGV 30 includes fork-lift system 38, it is important that fork-lift system 38 be fully retracted back to AGV 30 after depositing blanks 36 into cell 20. If fork-lift system 38 is not fully retracted, fork-lift system 38 can damage cell 20, which can be costly in terms of fixing or replacing machines of cell 20 as well as manufacturing productivity being decreased due to line 10 being shut down.

To ensure that fork-lift system 38 of AGV 30 is fully retracted before AGV 30 continues to move along line 10, each cell 20 can include a laser alignment system 40 that includes a laser-emitting device 42 and a reflector 44. Laser-emitting device 42 emits a laser 46 toward reflector 44, which reflects laser 46 back toward laser-emitting device 42. Once laser 46 is interrupted by fork-lift system 38, AGV 30 cannot move to the next cell 20 along line 10 unless laser 46 is uninterrupted. This ensures that fork-lift system 38 has been sufficiently retracted back into AGV 30 to avoid damage to cell 20 and line 10.

During use of laser alignment system 40, reflector 44 can become covered in dust or debris which can prevent laser 46 from being reflected back to laser-emitting device 42. This can cause cell 20 to fault, which shuts down line 10 until the fault is removed. Every time a cell 20 faults, machines of the cell 20 must be locked out until the fault is repaired. Every time cell 20 faults as a result of reflector 44 becoming dirty, therefore, manufacturing time is lost.

Figure 3:
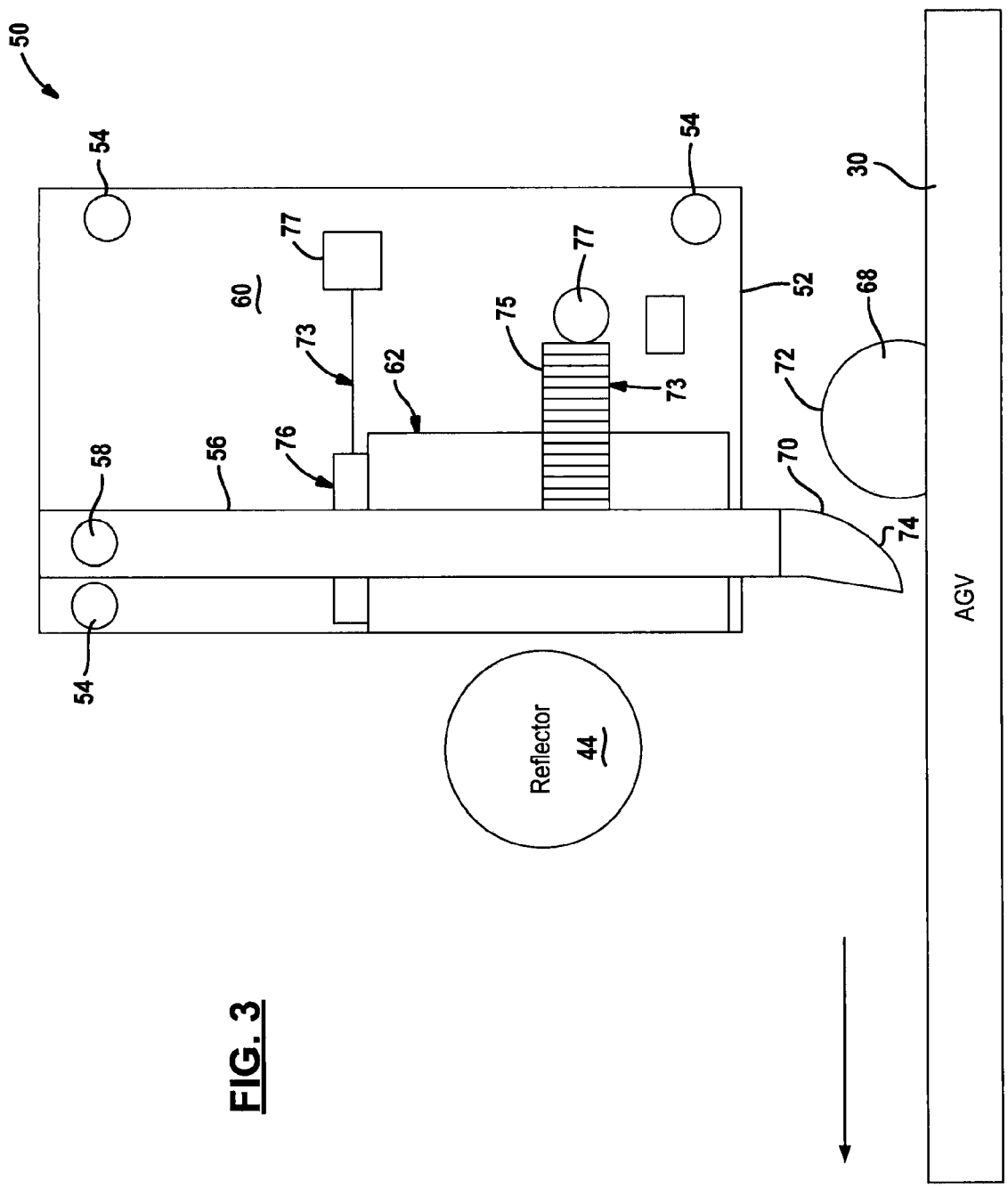
FIG. 3 is a schematic representation of a cleaning system according to a principle of the present disclosure in an non-actuated state.

To prevent reflector 44 from becoming dirty during operation of line 10, laser alignment system 40 can be equipped to include a cleaning system 50. As best illustrated in FIG. 3, cleaning system 50 includes a mounting base 52 mounted to floor 34. Mounting base 52 can be mounted to floor 34 by bolts or screws 54, or any other type of fastening device known to one of ordinary skill in the art.

Figure 5:
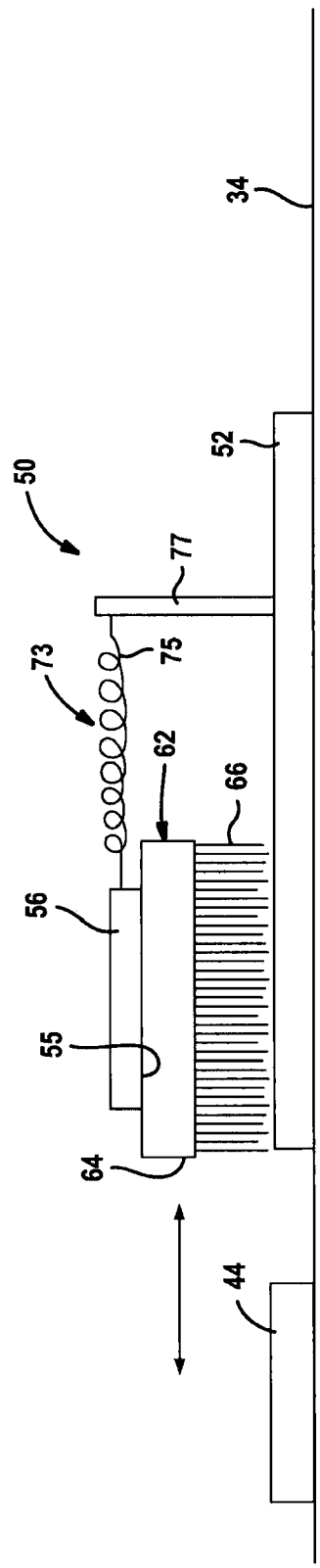
FIG. 5 is a schematic side view of a cleaning system according to a principle of the present disclosure.

An arm 56 is coupled to mounting base 52 by a pivot pin 58. Arm 56, therefore, can pivot relative a surface 60 of mounting base 52. Attached to a surface 55 of arm 56 that faces mounting base 52 is a cleaning device 62. As best illustrated in FIG. 5, cleaning device 62 can be a brush 64 having bristles 66 that wipe debris from reflector 44 when brush 64 passes over reflector 44. It should be understood, however, that brush 64 can be replaced with other types of cleaning devices without departing from the scope of the present disclosure. For example, brush 64 can be replaced by sponge-like material, a towel-like material, a roller, or any other type of cleaning device that can be used to wipe debris from reflector 44 to prevent, or at least substantially minimize, cell 20 from faulting as a result of reflector 44 being covered in dirt or debris.

To actuate cleaning device 62 over reflector 44 so that reflector 44 can be cleaned, arm 56 including cleaning device 2 must pivot outward relative to mounting base 56. To actuate arm 56, laser cleaning system 50 can be designed to operate in conjunction with AGV 30. In this regard, AGV 30 can include a contact dog or projection 68 that is operable to engage with arm 56 and actuate arm 56 including cleaning device 62 over reflector 44 to clean reflector 44.

More specifically, after AGV 30 has unloaded blanks 36 into cell 20 and retracted fork-lift system 38, AGV 30 is free to move to another cell 20 or to another location within the manufacturing facility. As AGV 30 leaves cell 20, projection 68 will contact a terminal end 70 of arm 56 to force arm 56 to pivot outward from mounting base 52. As arm 56 pivots outward from mounting base 52, cleaning device 62 will contact reflector 44 to remove any dirt or debris therefrom. This ensures that reflector 44 remains clean during operation of line 10, and prevents laser alignment system 40 from faulting. Projection 68 can be any shape desired. To assist in smooth engagement and disengagement between projection 68 and terminal end 70 of arm 56, both projection 68 and terminal end 70 can include rounded surfaces 72 and 74, respectively.

Figure 4:
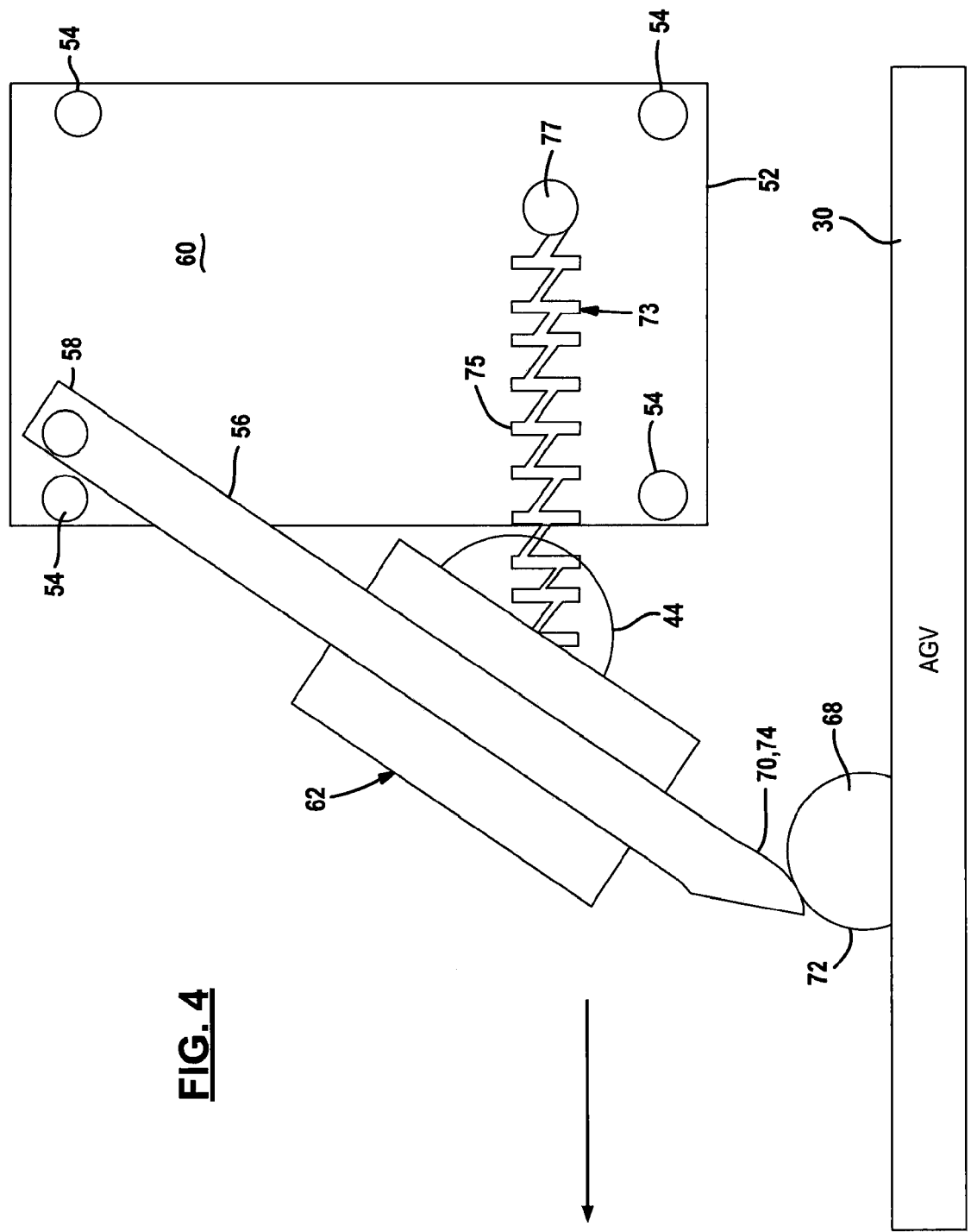
FIG. 4 is a schematic representation of the cleaning system of FIG. 3 in an actuated state.

Once AGV 30 has passed laser cleaning system 50, arm 56 can be forced to pivot back towards mounting base 52 through use of a retraction device 73. Retraction device 73 can be a spring 75, or can be a clock spring 76, each of which can be coupled to mounting base 52 through use of a support pin 77. Each configuration is illustrated in FIG. 3. For ease of illustration, clock spring 76 is not illustrated in FIG. 4, which illustrates actuation of arm 56 and cleaning device 62 relative to reflector 44 and mounting base 52. Use of retraction device 72 ensures that arm 56 pivots back toward mounting base 52 after cleaning device 62 has wiped reflector 44.

Using AGV 30 in conjunction with cleaning system 50 ensures that no additional costs are associated with operating laser cleaning system 50. That is, no motors or electricity are required to actuate arm 56 and cleaning device 62 to wipe reflector 44. Regardless, during operation of line 10, numerous AGVs 30 pass by laser cleaning system 50 each day. If each AGV 30 is provided with projection 68, reflector 44 will be cleaned each time an AGV 30 passes cleaning system 50, regardless whether AGV 30 stops at cell 20 where laser cleaning system 50 is located. It should be understood, however, that the present disclosure contemplates a configuration where laser cleaning system 50 is motor-actuated. In this regard, system 50 could be designed such that arm 56 is actuated every few minutes to ensure that reflector 44 remains free from dirt and debris. Alternatively, system 50 could be provided with an optical sensor 80 that detects when an AGV 30 has passed system 50. If optical sensor 80 detects an AGV 30 moving past, arm 56 can be actuated to clean reflector 44.

What is claimed is:

1. A manufacturing line, comprising:
   a laser system including a laser emitting device and a reflector;
   a cleaning system for cleaning the reflector, the cleaning system including a cleaning device mounted to a pivotable arm; and
   an automatic guided vehicle for actuating the cleaning system,
   wherein the pivotable arm is engaged by the automatic guided vehicle to sweep the cleaning device over the reflector.

2. The manufacturing line of claim 1, wherein the cleaning device is a brush.

3. The manufacturing line of claim 1, wherein the pivotable arm is coupled to a retraction device.

4. The manufacturing line of claim 3, wherein the retraction device is a spring.

5. The manufacturing line of claim 3, wherein the retraction device is a clock spring.

6. The manufacturing line of claim 1, wherein the automatic guided vehicle includes a projection that engages the pivotable arm.

7. A system, comprising:
   a plurality of cells located along a manufacturing line;
   an automatic guided vehicle for servicing the plurality of cells;
   a laser system for detecting a position of the automatic guided vehicle relative to one of the cells, the laser system including a reflector; and
   a cleaning system for cleaning the laser system, the cleaning system including a cleaning device mounted to a pivotable arm,
   wherein the pivotable arm is engaged by the automatic guided vehicle to sweep the cleaning device over the reflector as the automatic guided vehicle travels along the manufacturing line past the one cell.

8. The system of claim 7, wherein the cleaning device is a brush.

9. The system of claim 7, wherein the pivotable arm is coupled to a retraction device.

10. The system of claim 9, wherein the retraction device is a spring.

11. The system of claim 9, wherein the retraction device is a clock spring.

12. The system of claim 7, wherein the automatic guided vehicle includes a projection that engages the pivotable arm.

13. The system of claim 7, wherein each cell is a location along the manufacturing line in a stamping facility.

14. The system of claim 13, wherein at least one of the cells is a stamping press.

* * * * *